(12) United States Patent
Hung

(10) Patent No.: US 6,704,505 B1
(45) Date of Patent: Mar. 9, 2004

(54) AUTO-ZOOMING DEVICE

(75) Inventor: Ming-Te Hung, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/446,070

(22) Filed: May 28, 2003

(30) Foreign Application Priority Data

Oct. 17, 2002 (TW) ...................................... 091123920 A

(51) Int. Cl.⁷ ................................................. G03B 5/00

(52) U.S. Cl. ....................................................... 396/85

(58) Field of Search ............. 396/85–87; 359/696–698; 348/240.3

(56) References Cited

U.S. PATENT DOCUMENTS 4,828,360 A * 5/1989 Maruyama .................. 359/824
5,678,096 A * 10/1997 Wakabayashi et al. ...... 396/348

* cited by examiner

Primary Examiner—W. B. Perkey
(74) Attorney, Agent, or Firm—Birch, Stewart, Kolasch & Birch, LLP

(57) ABSTRACT

An auto-zooming device for a camera includes a lens, a first position device, a second position device, a magnet and a coil. The second position device is connected to the lens and engages with the first position device. The magnet is connected to the second position device. The coil is disposed around the magnet. When a current flows into the coil, the current induces a magnetic force to rotate the magnet. Meanwhile, the second position device rotates with the magnet and causes the lens to move forward or backward accordingly.

7 Claims, 3 Drawing Sheets

AUTO-ZOOMING DEVICE

CROSS REFERENCE TO RELATED APPLICATIONS

This application claims priority of Taiwan Patent Application Serial No. 091123920 filed on Oct. 17, 2003.

FIELD OF THE INVENTION

The present invention relates to an auto-zooming device, and more particularly, to an auto-zooming device used in a camera.

BACKGROUND OF THE INVENTION

Conventional zoom lenses used in a photographic apparatus usually work in two ways: manually or mechanically. The former, manual zooming, is obtained by rotating the lens with hands so that it can extend or withdraw. And the latter, auto-zooming, is generally obtained by using an additional driving apparatus, such as a motor, to move the lens.

FIG. 3 depicts a prior art of auto-zooming device. The auto-zooming device includes a lens 1, an extension part 3, a motor 5 and a screw 7. The extension part 3 extends from the lens 1 and has a hole for engaging with the screw 7 (not shown in FIG. 3). Accordingly, the screw 7 connects with the lens 1 through the extension part 3. The motor 5 drives the screw 7 to rotate. When the screw 7 rotates, the lens 1 moves forward or backward with the screw 7, which is indicated by arrows shown in FIG. 3.

In general, the size of motor 5 limits the size of the whole lens 1. However, with the trends that feature light-weighted and compact electronic devices, it is a very important task to develop lighter and more compact electronic devices.

SUMMARY OF THE INVENTION

One aspect of the present invention is to reduce the size and weight of the auto-zooming device in the camera.

The other aspect of the present invention is to lower down the noises generated when the lens is zooming in or out in the camera.

The present invention discloses an auto-zooming device used in a camera. The auto-zooming device includes a lens, a first positioning device, a second positioning device, a magnet and a coil. The first positioning device is disposed in the camera. The second positioning device is connected with the lens and engages with the first positioning device. When the second positioning device rotates, it moves axially along the first positioning device. Accordingly, the second positioning device drives the lens to move forward or backward to adjust the focal length. The magnet is connected with the second positioning device. The coil is disposed to loop around the magnet. When a current flows into the coil, the magnet is driven to rotate responsively by the magnetic force. The magnet can rotate selectively clockwise or counterclockwise according to the direction of the current, and also drive the second positioning device to rotate.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
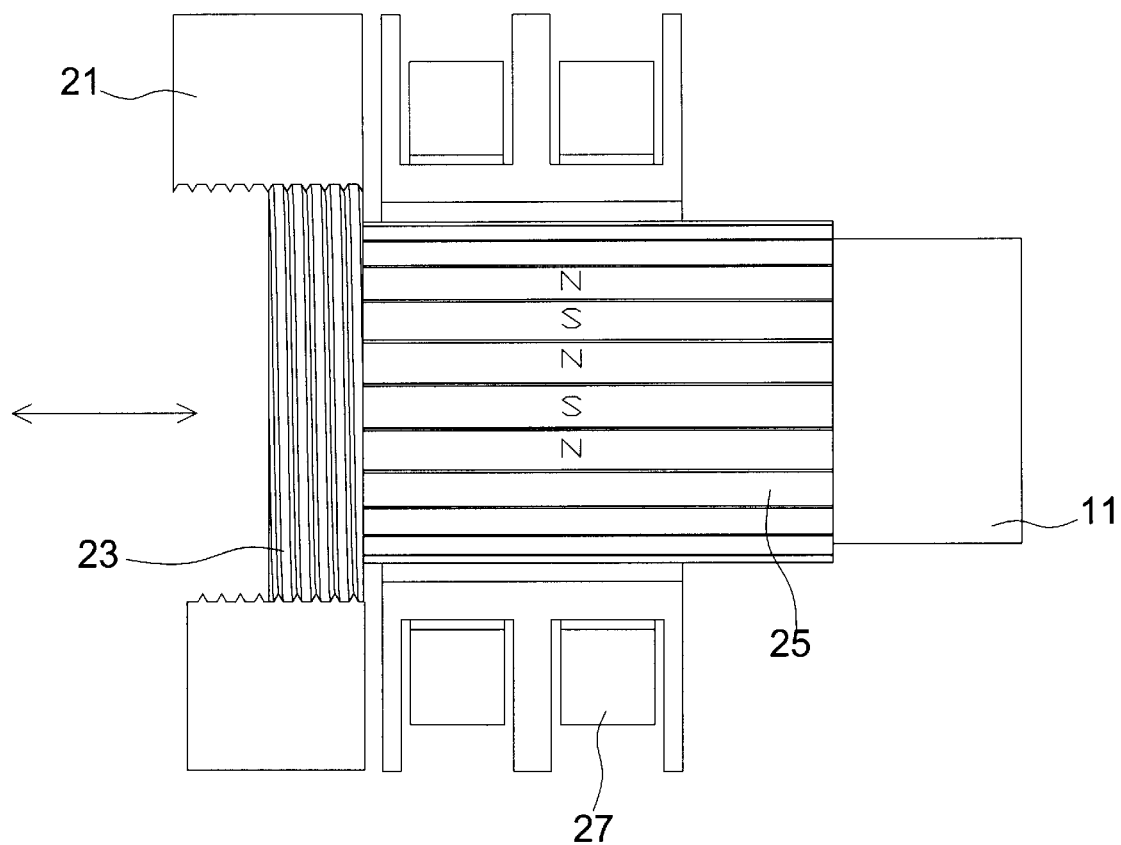
FIG. 1 depicts a top view of an auto-zooming device in accordance with an embodiment of the present invention.
Figure 2:
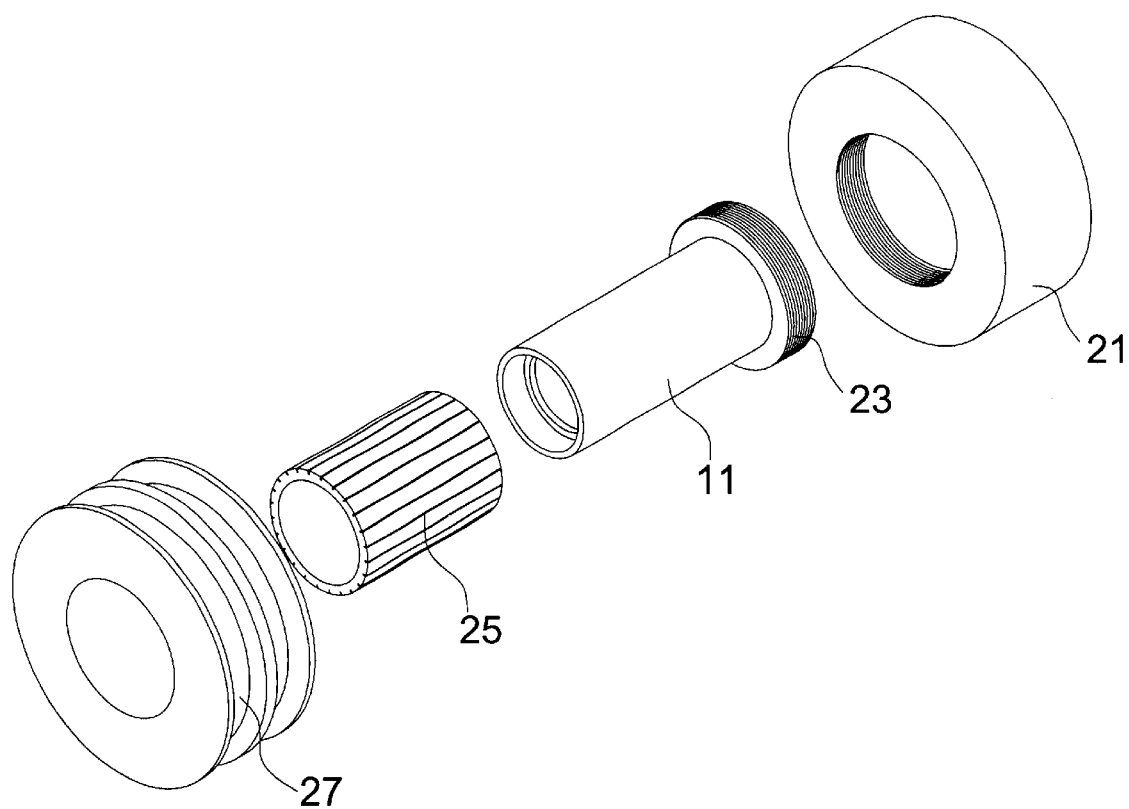
FIG. 2 depicts a disassembled view of an auto-zooming device in accordance with an embodiment of the present invention.
Figure 3:
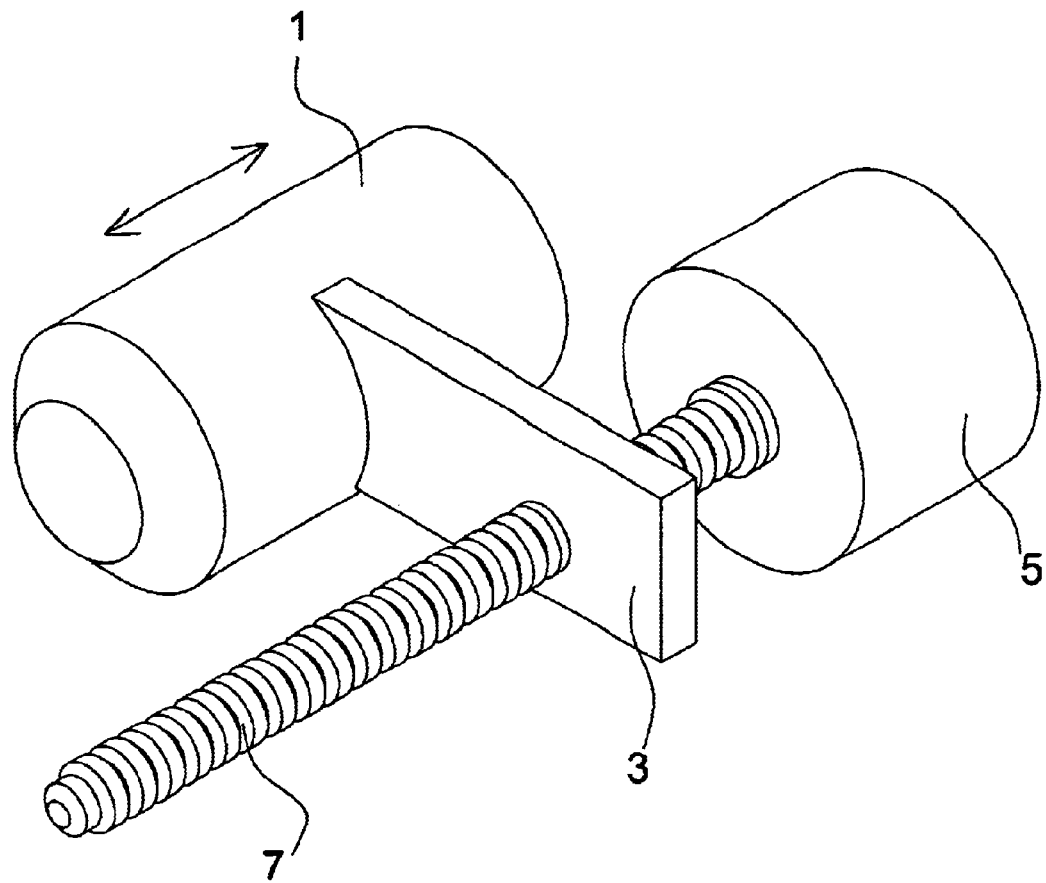
FIG. 3 depicts a prior art of auto-zooming device.

The present invention is to provide an auto-zooming device used in a photographic apparatus, such as a camera or a video camera. FIG. 1 and FIG. 2 are respectively a top view and a disassembled schema of an auto-zooming apparatus in accordance with an embodiment of the present invention. The present embodiment includes a lens 11, a first positioning device 21, a second positioning device 23, a magnet 25 and a coil 27.

As shown in FIG. 1 and FIG. 2, the first positioning device 21 is disposed in a camera with fixed position. The second positioning device 23 is connected with the lens 11 and engages with the first positioning device 21. Therefore, when the second positioning device 23 rotates, it will move axially along the first positioning device 21, as indicated by the arrows shown in FIG. 1. Accordingly, the second positioning device 23 drives the lens 11 to move forward or backward. The position of the lens 11 changes, and so does the focal length of the photographic apparatus.

The magnet 25 and the coil 27 disposed in the auto-zooming apparatus are both designed according to the operation principle of conventional motors. The magnet 25 is connected with the second positioning device 23. The coil 27 is disposed to loop around the magnet 25. When a current flows into the coil 27, the magnet 25 is driven to rotate responsively by the magnetic force. If the direction of the current is changed, the magnet 25 rotates in a reverse direction, clockwise or counterclockwise. Because the magnet 25 is connected with the second positioning device 23, when the magnet 25 drives the second positioning device 23 to rotate, the lens II will also be driven to move backward or forward.

In this embodiment, the magnet 25 may be a tube-shaped magnet with N and S poles, as indicated in FIG. 1. The magnet 25 of this embodiment is detachably connected to the lens 11, as well as to the second positioning device 23. As a result, this arrangement reduces the accommodating space and weight of the auto-zooming apparatus in a camera. Besides, since no conventional motor is provided in the present embodiment to drive the lens 11 to move, the noises are reduced when the lens 11 is zooming in or out.

In addition, the first positioning device 21 can be a screw or a helicoid thread device. And the second positioning device 23 can be of a substance engaging with the first positioning device 21, such as a screw or a helicoids thread device.

The present invention has been described above with reference to a preferred embodiment. However, those skilled in the art will recognize that many others may be implemented in alternate way without departing from the scope of the present invention. Accordingly, the present exemplary embodiment can be provided to illustrate rather than to limit. The present invention is not limited to the details described above and can be practiced with an equivalent modification or change defined as the appended claims.

What is claimed is:

1. An auto zoom apparatus for a camera, comprising:
   a lens;
   a first positioning device disposed in said camera;

a rotatable second positioning device being connected with said lens and engaging with said first positioning device, as said second positioning device rotating to move with respect to said first positioning device, said second positioning device drives said lens to move;

a magnet connected with said second positioning device; and a coil disposed to loop around said magnet, said magnet rotates for driving said second positioning device to move said lens as a current flows into said coil.

2. The auto zoom apparatus of claim 1, wherein said first positioning device comprises a screw.

3. The auto zoom apparatus of claim 1, wherein said first positioning device comprises a helicoid thread device.

4. The auto zoom apparatus of claim 1, wherein said second positioning device comprises a screw.

5. The auto zoom apparatus of claim 1, wherein said second positioning device comprises a helicoid thread device.

6. The auto zoom apparatus of claim 1, wherein said magnet comprises a tube-shaped magnet.

7. The auto zoom apparatus of claim 1, wherein said magnet selectively rotates clockwise and counterclockwise.

* * * * *